United States Patent [19]

Hoessel et al.

[11] Patent Number: 5,059,660

[45] Date of Patent: Oct. 22, 1991

[54] SELF-BONDING ENAMEL SOLUTION FOR HEAT-RESISTANT COATINGS

[75] Inventors: Peter Hoessel, Schifferstadt; Hans Schupp, Worms; Klaus Lienert, Hamburg; Helmut Lehmann, Rheinbek, all of Fed. Rep. of Germany

[73] Assignee: BASF Aktiengesellschaft, Ludwigshafen, Fed. Rep. of Germany

[21] Appl. No.: 521,030

[22] Filed: May 9, 1990

[30] Foreign Application Priority Data

May 26, 1989 [DE] Fed. Rep. of Germany ....... 3917197

[51] Int. Cl.$^5$ .................. C08L 77/00; C08G 18/00
[52] U.S. Cl. .................. 525/419; 525/424; 528/67
[58] Field of Search .......... 525/424, 419, 67, 424; 528/349

[56] References Cited

U.S. PATENT DOCUMENTS

| 4,420,535 | 12/1983 | Walrath et al. | 428/379 |
| 4,505,978 | 3/1985 | Smith | 428/379 |
| 4,751,107 | 6/1988 | Reiter et al. | 525/425 |

FOREIGN PATENT DOCUMENTS

3612372 11/1986 Fed. Rep. of Germany .

Primary Examiner—John C. Bleutge
Assistant Examiner—Thomas Hamilton, III
Attorney, Agent, or Firm—Keil & Weinkauf

[57] ABSTRACT

Self-bonding enamel solutions contain
A) from 5 to 80% by weight of a copolyamide composed of units which are derived from
A$_1$) organic dicarboxylic acids

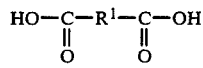

where $R^1$ is an aliphatic radical of 1 to 20 carbon atoms or an aromatic radical of 5 to 25 carbon atoms,
and
A$_2$) a mixture of diisocyanates, consisting of
a$_{21}$) from 20 to 95 mol % of a diisocyanate of the general formula

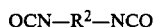

where $R^2$ is an aromatic radical of 5 to 25 carbon atoms,
a$_{22}$) from 5 to 70 mol % of a diisocyanate of the general formula

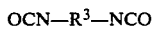

where $R^3$ is

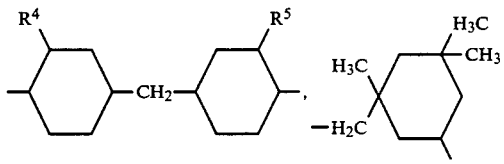

or a linear aliphatic radical of 3 to 30 carbon atoms which is substituted by 1 to 3 $C_1$–$C_4$-alkyl groups and $R^4$ and $R^5$ independently of one another are each $C_1$–$C_4$-alkyl or hydrogen, and
a$_{23}$) from 0 to 20 mol % of a diisocyanate of the general formula

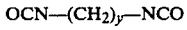

where y is an integer of from 1 to 20, and
B) from <0.5 to 30% by weight of a blocked di- or polyisocyanate
in an organic solvent or solvent mixture.

10 Claims, No Drawings

SELF-BONDING ENAMEL SOLUTION FOR HEAT-RESISTANT COATINGS

The present invention relates to a self-bonding enamel solution containing

A) from 5 to 80% by weight of a copolyamide composed of units which are derived from $A_1$) organic dicarboxylic acids

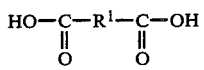

where $R^1$ is an aliphatic radical of 1 to 20 carbon atoms or an aromatic radical of 5 to 25 carbon atoms, and $A_2$) a mixture of diisocyanates, consisting of $a_{21}$) from 20 to 95 mol % of a diisocyanate of the general formula

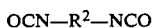

where $R^2$ is an aromatic radical of 5 to 25 carbon atoms, $a_{22}$) from 5 to 70 mol % of a diisocyanate of the general formula

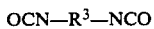

where $R^3$ is

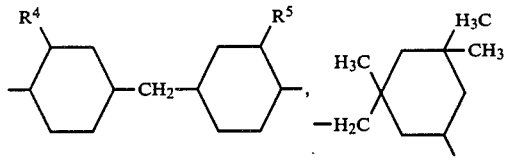

or a linear aliphatic radical of 3 to 30 carbon atoms which is substituted by 1 to 3 $C_1$-$C_4$-alkyl groups and $R^4$ and $R^5$ independently of one another are each $C_1$-$C_4$-alkyl or hydrogen, and $a_{23}$) from 0 to 20 mol % of a diisocyanate of the general formula

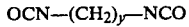

where y is an integer of from 1 to 20, and

B) from <0.5 to 30% by weight of a blocked di- or polyisocyanate in an organic solvent or solvent mixture. Heat-curable self-bonding enamels are used for the production of formers which are subjected to mechanical and thermal stress and consist of enamelled wires and whose windings are bonded to one another by melting and subsequent solidification of such a self-bonding enamel layer, with the aid of an external heat supply or Joule heat.

Two basic types can in principle be used as self-bonding enamels, ie. thermoplastic and thermosetting systems.

U.S. Application No. 4 505 978 discloses thermoplastic systems of partly aromatic polyamides.

Thermoplastic systems generally have the disadvantage that the resoftening temperature is virtually identical to the bonding temperature. A high resoftening temperature, which is desirable for heat-resistant applications, necessitates a bonding temperature which is likewise high; as low bonding temperatures, resoftening temperatures in turn are undesirably low.

Partly aromatic polyamide solutions are also disclosed in DE-A 36 12 372. The resoftening temperatures of the self-bonding enamels obtained from the solutions are stated as 180°-200° C.

The partly aromatic systems disclosed in U.S. Applicaiton No. 4 420 535 also do not have completely satisfactory properties.

Compared with partly aromatic polyamide solutions, aliphatic polyamide solutions have the disadvantage that toxic solvents, especially cresol, have to be used.

Thermosetting, heat-curable self-bonding enamels are converted from a thermoplastic state to the final cured state as a result of a crosslinking reaction during bonding.

The problem with such thermosetting, heat-curable self-bonding enamels is that both the type of crosslinking agent and the combination of base resin with the crosslinking agent must be finely tailored so that the thermoplastic state and the bonding capability are retained in the coating process and at the same time a final cured state which is highly heat-resistant is achieved after bonding.

DE-A 35 17 753 discloses a polyamide solution in which a cured thermosetting self-bonding enamel is obtained by adding blocked di- or polyisocyanate as a crosslinking agent. The resoftening temperature of 193° C. achieved after bonding for 30 minutes at 180° C. is not yet sufficient for high requirements.

By adding blocked polyisocyanate crosslinking agents, it was intended to avoid adversely affecting the shelf life of self-bonding enamel solutions. Crosslinking reactions take place in the self-bonding enamel solution itself, which are detectable from a rise in the viscosity and increase the required bonding temperature and in general adversely affect the bonding capability.

It is an object of the present invention to provide self-bonding enamel solutions for heat-resistant coatings. The self-bonding enamels obtained from the solutions should possess high resoftening temperatures in conjunction with low bonding temperatures, while the solutions should have a long shelf life and be substantially free of toxic solvents.

We have found that this object is achieved, according to the invention, by self-bonding enamel solutions containing A) from 5 to 80% by weight of a copolyamide composed of units which are derived from $A_1$) organic dicarboxylic acids

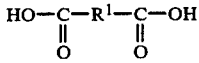

where $R^1$ is an aliphatic radical of 1 to 20 carbon atoms or an aromatic radical of 5 to 25 carbon atoms, and $A_2$) a mixture of diisocyanates, consisting of $a_{21}$) from 20 to 95 mol % of a diisocyanate of the general formula

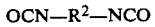

where $R^2$ is an aromatic radical of 5 to 25 carbon atoms, $a_{22}$) from 5 to 70 mol % of a diisocyanate of the general formula

OCN—R³—NCO where R³ is

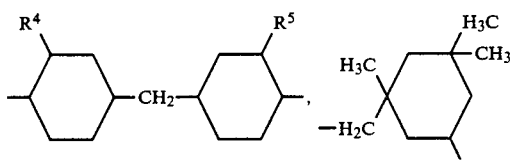

or a linear aliphatic radical of 3 to 30 carbon atoms which is substituted by 1 to 3 $C_1$–$C_4$-alkyl groups and $R^4$ and $R^5$ independently of one another are each $C_1$–$C_4$-alkyl or hydrogen, and a23) from 0 to 20 mol % of a diisocyanate of the general formula OCN—(CH₂)$_y$—NCO where y is an integer of from 1 to 20, and B) from <0.5 to 30% by weight of a blocked di- or polyisocyanate in an organic solvent or solvent mixture. In the dicarboxylic acids $A_1$

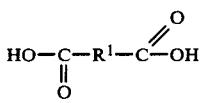

$R^1$ may be an aliphatic radical of 1 to 20 carbon atoms or an aromatic radical of 5 to 25 carbon atoms.

Preferred aliphatic dicarboxylic acids are linear aliphatic dicarboxylic acids

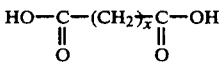

where x is an integer of from 1 to 16, particularly preferably from 3 to 12, azelaic and sebacic acid and mixtures thereof being very particularly preferred.

Suitable aromatic dicarboxylic acids are cyclo pentadienyl-, phenyl-, naphthyl- and biphenyldicarboxylic acids and mixtures of these acids, in which the aromatic ring systems may be substituted. Substituents may be, for example, alkyl or alkoxy, preferably $C_1$–$C_4$-alkyl or alkoxy. The aromatic ring systems may be both fused and bridged via heteroatoms or carbon atoms or carbon chains.

Examples of the last-mentioned dicarboxylic acids are diphenylmethane-, diphenylsulfone- and diphenyl oxide dicarboxylic acids. Mixtures of aromatic dicarboxylic acids can also be used.

Unsubstituted or substituted phenyl-, naphthyl or diphenylmethanedicarboxylic acids are preferably used.

Isophthalic acid, terephthalic acid and naphthalenedicarboxylic acids are particularly preferred.

A mixture of aliphatic and aromatic dicarboxylic acids are particularly preferably used, the molar ratio of aliphatic to aromatic dicarboxylic acids being from 6 : 1 to 1 : 2, particularly preferably from 4 : 1 to 1 : 1.

The use of a mixture of aliphatic and aromatic dicarboxylic acids in a molar ratio of from 2.5 : 1 to 1.5 : 1, in particular about 2 : 1, is very particularly preferred.

The diisocyanates $A_2$ used are a mixture of diisocyanates, consisting of a21) from 20 to 95 mol % of a diisocyanate of the general formula

OCN—R²—NCO where $R^2$ is an aromatic radical of 5 to 25 carbon atoms, a22) from 5 to 70 mol % of a diisocyanate of the general formula

OCN—R³—NCO where R³ is

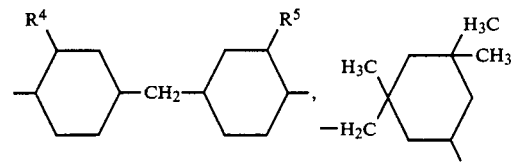

or a linear aliphatic radical of 3 to 30 carbon atoms which is substituted by 1 to 3 $C_1$–$C_4$-alkyl groups and $R^4$ and $R^5$ independently of one another are each $C_1$–$C_4$-alkyl or hydrogen, and a23) from 0 to 20 mol % of a diisocyanate of the general formula OCN—(CH₂)$_y$—NCO where y is an integer of from 1 to 20.

Examples of suitable diisocyanates $a_{21}$ are cyclopentadienyl, phenyl, naphthyl and diphenyl diisocyanates, in which the aromatic ring groups may be substituted. Substituents may be, for example, alkyl or alkoxy, preferably $C_1$–$C_4$-alkyl or alkoxy. The aromatic ring systems may be both fused and bridged via heteroatoms or carbon atoms or carbon chains. Examples are diphenylmethane 2,4'-diisocyanate, diphenylmethane 4,4'-diisocyanate, 4,4'-diisocyanatodiphenyl ether, diisocyanatodiphenyl sulfone, 1,3-phenylene diisocyanate, 1,4-phenylene diisocyanate and 2,4-toluylene diisocyanate.

Unsubstituted or substituted phenyl-, naphthyl and diphenylmethane diisocyanates are preferably used.

2,4-Toluylene diisocyanate and diphenylmethane 4,4'-diisocyanate are particularly preferably used.

A single aromatic diisocyanate or a mixture of aromatic diisocyanates may be used as component $a_{21}$.

The diisocyanates $a_{22}$ are diisocyanates of the general formula

OCN—R³—NCO where R³ is

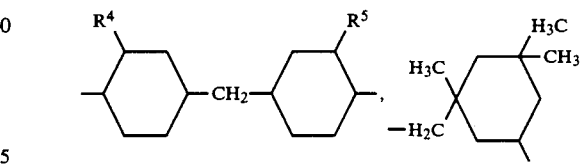

or a linear aliphatic radical of 3 to 30, preferably 5 to 20, carbon atoms which are substituted by 1 to 3 $C_1$–$C_4$- alkyl groups and $R^4$ and $R^5$ are each $C_1$-$C_4$-alkyl or hydrogen. In particular, $R^4$ and $R^5$ are each methyl or ethyl.

Particularly preferably used diisocyanates $a_{22}$ are 3,3'-dimethyldicyclohexylmethane 4,4'-diisocyanate, isophorone diisocyanate and trimethylhexamethylene diisocyanate. Mixtures of the compounds mentioned as diisocyanates $a_{22}$ may also be used.

The diisocyanates $a_{23}$ according to claim 1 are linear aliphatic diisocyanates of the general formula

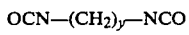
OCN—(CH$_2$)$_y$—NCO where y is an integer from 1 to 20, preferably from 4 to 15, particularly preferably from 6 to 12, which are used individually or as a mixture.

The mixtures of diisocyanates $a_{21}$ to $a_{23}$ are used in the following molar ratios:
from 20 to 95, preferably from 30 to 90, mol % of the diisocyanates $a_{21}$),
from 5 to 70, preferably from 10 to 60, mol % of the diisocyanates $a_{22}$) and
from 0 to 20, preferably from 0 to 10, mol % of the diisocyanates $a_{23}$).

From 40 to 80 mol % of the diisocyanates $a_{21}$) and from 20 to 60 mol % of the diisocyanates $a_{22}$) are particularly preferred.

A roughly equimolar mixture of 2,4-toluylene diisocyanate, diphenylmethane 4,4'-diisocyanate and an isomer mixture of 2,2,4- and 2,4,4-trimethylhexamethylene diisocyanate (HÜLS AG) is very particularly preferred.

The molar ratio of the sum of the dicarboxylic acids used to the sum of the diisocyanates used is preferably from 1 : 1 to 1 : 0.8, in particular from 1 : 0.99 to 1 : 0.95.

Lactams of the general formula

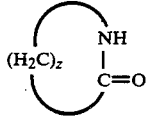

where z is an integer of from 3 to 22, are preferably used as blocking agents for the di- or polyisocyanates of component B, in order to avoid the liberation of toxic gases during the subsequent bonding, such liberation occurring, for example, during the vaporization of phenols.

Caprolactam is particularly preferably used as a blocking agent. Examples of suitable polyisocyanates are diphenylmethane diisocyanate, phenylene diisocyanate, toluylene diisocyanate, Lupranat ® MS (BASF AG) and Desmodur ® L (BAYER AG). Lupranat ® MS is a mixture of diphenylmethane 4,4'-diisocyanate and 2,4'-diisocyanate and oligomers of diphenylmethane diisocyanates.

Desmodur ® L is preferably used as the polyisocyanate, this being a reaction product of a toluylene diisocyanate and a polyalcohol mixture.

Leveling agents conventionally used in the coating industry and other assistants, such as rosin, benzotriazole, etc., may be added to the solutions, in conventional amounts, for example up to 1% by weight.

For the preparation of the copolyamide A, the above-mentioned starting compounds can preferably be initially taken in amide solvents having boiling points of from 60° to 250° C., preferably in N-methylpyrrolidone, and the stirred mixture can be heated to 180°-200° C. in the course of from 1 to 20 hours. Preferably, a 5–80% strength solution of the reaction products is first prepared, from which, after completion of the reaction with N-methylpyrrolidone, 10–50% strength solutions having viscosities of from 100 to 5,000, preferably from 200 to 3,000, mPa.s (23° C.) can be obtained, if necessary by the addition of other solvents, such as xylene or toluene.

After the reaction of the dicarboxylic acids with the diisocyanates, from <0.5 to 30% by weight, based on the solution, of a blocked polyisocyanate B) are added before, during or after dilution with solvents, at from 20° to 120° C., with continued thorough mixing.

The resulting self-bonding enamel solutions show no marked increase in viscosity over a period of 6 months and therefore have a long shelf life.

The novel self-bonding enamel solutions are applied in general to copper or aluminum wires which have been coated with an insulating layer which is conventionally used in the electrical industry and consists of resins, such as polyesterimides, polyesters or polyamidoimides, which are resistant to high temperatures. To dry the individual self-bonding enamel layers, these insulating wires are coated at baking temperatures of, for example, from 200° to 600° C., preferably from 300° to 400° C., and at coating speeds of, for example, from 10 to 60, preferably from 25 to 35, m/min.

This gives stable enamelled wires which have good winding properties and, in the form of the appropriate former, can be bonded by hot air or by Joule heat.

The novel self-bonding enamel solutions, preferably those which contain lactam-blocked polyisocyanates, can be readily applied. In the described coating of the wires and drying of the enamel layer, crosslinking sufficient for curing has not yet taken place. The formers obtained from the wires can therefore be bonded at relatively low temperatures of about 180° C. and, after bonding, have good properties with high resoftening temperatures and good bonding strength.

EXAMPLE 1

202.0 g (1.000 mole) of sebacic acid and 83.0 g (0.500 mole) of terephthalic acid in 870.0 g of N-methylpyrrolidone were initially taken. Immediately after the addition of 86.2 g (0.495 mole) of 2,4-toluylene diisocyanate, 123.8 g (0.495 mole) of diphenylmethane 4,4-diisocyanate and 104.0 g (0.495 mole) of trimethylhexamethylene diisocyanate (mixture of the 2,2,4- and 2,4,4- (isomers; HÜLS AG), the mixture was heated to 80° C, brought to 180° C. at 10° C./hour and kept at this temperature for 1 hour. After the mixture had been cooled to 23° C., the viscosity was 7620 mPa.s at a solids content of 35%. After the addition of 92.6 g of a 50% strength solution of caprolactam-blocked Desmodur L ® (BAYER AG) in N-methylpyrrolidone, the solids content was brought to 20% with xylene.

The viscosity of the 20% strength solution was 210 mPa.s at 23° C. This solution was stable over a period of 6 months in the temperature range from −10° to 45° C.

A 0.315 mm copper wire coated with a commercial polyesterimide basecoat was coated with this enamel on a conventional wire enameling machine. A bonded coil had the following properties, determined according to DIN 46,435:

Enameling oven temperature: front 320° C.; rear 340° C. (oven length 2.50 m).
Bonding conditions: 30 minutes at 180° C.
Resoftening temperature: 255° C.

Enameling oven temperature: front 340° C.; rear 360° C.
Bonding conditions: 30 minutes at 180° C.
Resoftening temperature: 268° C.
Enameling oven temperature: front 360° C.; rear 380° C.
Bonding conditions: 30 minutes at 180° C.
Resoftening temperature: 250° C.

The test using the torsion bar (R. Steinhaus, Proc. of the 15th Electronic/Electrical Insulation Conference, Chicago 1981, IEEE Publ. No. 81/CH 1717 8/81, page 56 (1981), and R. Steinhaus, Proc. of the 18th Electronic/Electrical Insulation Conference, Chicago 1987, IEEE Publ. No. 87/CH 2451-.1, page 152 (1987)) gave the following bonding strengths:
23° C.: 280; 130° C.: 170; 155° C.: 40; 165° C.: 25; 175° C.: 18 Newton.

EXAMPLE 2

146.1 g (1.000 mole) of adipic acid and 83.0 g (0.500 mole) of terephthalic acid in 870.0 g of N-methylpyrrolidone were initially taken. Immediately after the addition of 86.2 g (0.495 mole) of 2,4-toluylene diisocyanate, 123.8 g (0.495 mole) of diphenylmethane 4,4-diisocyanate and 104.0 g (0.495 mole) of trimethylhexamethylene diisocyanate (mixture of the 2,2,4- and 2,4,4-isomers; HÜLS AG), the mixture was heated to 80° C., brought to 180° C. at 10° C./hour and kept at this temperature for 1 hour. After the mixture had been cooled to 23° C., the viscosity was 7900 mPa.s at a solids content of 35%. After the addition of 92.6 g of a 50% strength solution of caprolactam-blocked Desmodur L ® (BAYER AG) in Nmethylpyrrolidone, the solids content was brought to 20% with xylene.

The viscosity of the 20% strength solution was 250 mPa.s at 23° C. This solution was stable over a period of 6 months in the temperature range from −10° to 45° C.

A 0.315 mm copper wire coated with a commercial polyesterimide basecoat was coated with this enamel on a conventional wire enameling machine. A bonded coil had the following properties, determined according to DIN 46,435:
Enameling oven temperature: front 320° C.; rear 340° C. (oven length 2.50 m)
Bonding conditions: 30 minutes at 180° C .
Resoftening temperature: 260° C.
Enameling oven temperature: front 340° C.; rear 360° C.
Bonding conditions: 30 minutes at 180° C.
Resoftening temperature: 277° C.
Enameling oven temperature: front 360° C.; rear 380° C.
Bonding conditions: 30 minutes at 180° C.
Resoftening temperature: 255° C.

The test using the torsion bar (R. Steinhaus, Proc. of the 15th Electronic/Electrical Insulation Conference, Chicago 1981, IEEE Publ. No. 81/CH 1717 - 8/81, page 56 (1981), and R. Steinhaus, Proc. of the 18th Electronic/Electrical Insulation Conference, Chicago 987, IEEE Publ. No. 87/CH 2451-.1, page 152 (1987)) gave the following bonding strengths:
3° C.: 280; 130° C.: 180; 155° C.: 50 Newton.

EXAMPLE 3

202.0 g (1.000 mole) of sebacic acid and 83.0 g (0.500 mole) of terephthalic acid in 870.0 g of N-methylpyrrolidone were initially taken. Immediately after the addition of 86.2 g (0.495 mole) of 2,4-toluylene diisocyanate, 123.8 g (0.495 mole) of diphenylmethane 4,4-diisocyanate and 110.0 g (0.495 mole) of isophorone diisocyanate (HÜLS AG), the mixture was heated to 80° C., brought to 180° C. at 10° C./hour and kept at this temperature for 1 hour. After the mixture had been cooled to 23° C., the viscosity was 7620 mPa.s at a solids content of 35%. After the addition of 92.6 g of a 50% strength solution of caprolactam-blocked Desmodur L" (BAYER AG) in N-methylpyrrolidone, the solids content was brought to 20% with xylene.

The viscosity of the 20% strength solution was 190 mPa.s at 23° C. This solution was stable over a period ( of 6 months in the temperature range from −10° to 45° C.

A 0.315 mm copper wire coated with a commercial polyesterimide basecoat was coated with this enamel on a conventional wire enameling machine. A bonded coil had the following properties, determined according to DIN 46,435:
Enameling oven temperature: front 320° C.; rear 340° C. (oven length 2.50 m).
Bonding conditions: 30 minutes at 180° C.
Resoftening temperature: 255° C.
Enameling oven temperature: front 340° C.; rear 360° C.
Bonding conditions: 30 minutes at 180° C .
Resoftening temperature: 263° C.
Enameling oven temperature: front 360° C.; rear 380° C.
Bonding conditions: 30 minutes at 180° C.
Resoftening temperature: 255° C.

The test using the torsion bar (R. Steinhaus, Proc. of the 15th Electronic/Electrical Insulation Conference, Chicago 1981, IEEE Publ. No. 81/CH 1717 - 81, page 56 (1981), and R. Steinhaus, Proc. of the 18th Electronic/Electrical Insulation Conference, Chicago 987, IEEE Publ. No. 87/CH 2451-.1, page 152 (1987)) gave the following bonding strengths:
3° C.: 280; 130° C.: 160; 155° C.: 40 Newton.

COMPARATIVE EXAMPLE

For comparison, a commercial polyamide-based self-bonding enamel (XWE-1539, Schenectady) was tested:
The solids content was 17% at a viscosity of 20 mPa.s.
Enameling oven temperature: front 320° C.; rear 340° C.
Bonding conditions: 30 minutes at 180° C .
Resoftening temperature: 194° C.
Enameling oven temperature: front 340° C.; rear 360° C.
Bonding conditions: 30 minutes at 180° C.
Resoftening temperature: 196° C.
Enameling oven temperature: front 360° C.; rear 380° C.
Bonding conditions: 30 minutes at 180° C.
Resoftening temperature: 188° C.

The test using the torsion bar gave the following bonding strengths:
23° C.: 200; 130° C.: 45; 155° C.: 16 Newton.

We claim:
1. A self-bonding enamel solution containing
    A) from 5 to 80% by weight of a copolyamide composed of units which are derived from
    $A_1$) organic dicarboxylic acids

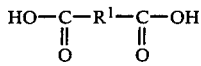

where $R^1$ is an aliphatic radical of 1 to 20 carbon atoms or an aromatic radical of 5 to 25 carbon atoms,
and $A_2$) a mixture of diisocyanates, consisting of $a_{21}$) from 20 to 95 mol % of a diisocyanate of the formula

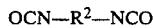

where $R^2$ is an aromatic radical of 5 to 25 carbon atoms, $a_{22}$) from 5 to 70 mol % of a diisocyanate of the formula

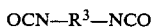

where $R^3$ is

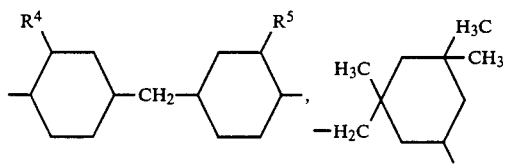

or a linear aliphatic radical of 3 to 30 carbon atoms which is substituted by 1 to 3 $C_1$-$C_4$-alkyl groups and $R^4$ and $R^5$ independently of one another are each $C_1$-$C_4$-alkyl or hydrogen, and $a_{23}$) from 0 to 20 mol % of a diisocyanate of the formula

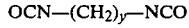

where y is an integer of from 1 to 20, and

B) from <0.5 to 30% by weight of a blocked di- or polyisocyanate in an organic solvent or solvent mixture.

2. A self-bonding enamel solution as defined in claim 1, wherein the copolyamide contains the compounds $A_1$ and $A_2$ in a molar ratio of from 1 : 1 to 1 : 0.8.

3. A self-bonding enamel solution as claimed in claim 2, wherein the molar ratio $A_1$: $A_2$ is from 1 : 0.99 to 1 : 0.95.

4. A self-bonding enamel solution as claimed in claim 1, wherein the organic dicarboxylic acids $A_1$ consist of aliphatic and aromatic dicarboxylic acids in a molar ratio of from 6 : 1 to 1 : 2.

5. A self-bonding enamel solution as defined in claim 4, wherein the organic dicarboxylic acids $A_1$ consist of aliphatic and aromatic dicarboxylic acids in a molar ratio of from 2.5 : 1 to 1.5 : 1.

6. A self-bonding enamel solution as defined in claim 1, wherein the dicarboxylic acid $A_1$ is sebacic acid, azelaic acid, terephthalic acid or a mixture thereof.

7. A self-bonding enamel solution as claimed in claim 1, wherein the diisocyanate $a_{22}$ is a trimethylhexamethylene diisocyanate.

8. A self-bonding enamel solution as claimed in claim 1, wherein the diisocyanate $A_2$ is a mixture of 2,4-toluylene diisocyanate, diphenylmethane diisocyanate and trimethylhexamethylene diisocyanates.

9. A self-bonding enamel solution as defined in claim 1, wherein the blocked di- or polyisocyanates are blocked with lactams of the formula

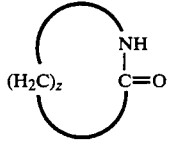

where z is an integer 3 to 22.

10. A wire coated with a self-bonding enamel and obtained using a self-bonding enamel solution as defined in claim 1.

* * * * *

UNITED STATES PATENT AND TRADEMARK OFFICE
CERTIFICATE OF CORRECTION

PATENT NO. : 5,059,660

DATED : October 22, 1991

INVENTOR(S) : Hoessel et al

It is certified that error appears in the above-identified patent and that said Letters Patent is hereby corrected as shown below:

In column 10, line 1, (claims 3, 4, 7, and 8) delete "claimed" and insert --defined--.

Signed and Sealed this

Sixteenth Day of November, 1993

*Attest:*

BRUCE LEHMAN

*Attesting Officer*           *Commissioner of Patents and Trademarks*